United States Patent
Suk (10) Patent No.: US 9,448,067 B2
(45) Date of Patent: Sep. 20, 2016

(54) SYSTEM AND METHOD FOR PHOTOGRAPHING MOVING SUBJECT BY MEANS OF MULTIPLE CAMERAS, AND ACQUIRING ACTUAL MOVEMENT TRAJECTORY OF SUBJECT BASED ON PHOTOGRAPHED IMAGES

(71) Applicant: CREATZ INC., Seoul (KR)

(72) Inventor: Yong Ho Suk, Seongnam-si (KR)

(73) Assignee: CREATZ INC., Seoul (KR)

( * ) Notice: Subject to any disclaimer, the term of this patent is extended or adjusted under 35 U.S.C. 154(b) by 250 days.

(21) Appl. No.: 14/346,735

(22) PCT Filed: Sep. 24, 2012

(86) PCT No.: PCT/KR2012/007673
§ 371 (c)(1),
(2) Date: Mar. 23, 2014

(87) PCT Pub. No.: WO2013/043020
PCT Pub. Date: Mar. 28, 2013

(65) Prior Publication Data
US 2014/0247345 A1    Sep. 4, 2014

(30) Foreign Application Priority Data

Sep. 23, 2011    (KR) .................... 10-2011-0096352

(51) Int. Cl.
| | |
|---|---|
| *H04N 7/18* | (2006.01) |
| *G01C 11/02* | (2006.01) |
| *G06T 7/20* | (2006.01) |
| *A63B 24/00* | (2006.01) |
| *A63B 71/02* | (2006.01) |
| *A63F 13/00* | (2014.01) |
| *G01C 11/36* | (2006.01) |

(52) U.S. Cl.
CPC ........... *G01C 11/02* (2013.01); *A63B 24/0021* (2013.01); *A63B 71/022* (2013.01); *A63F 13/005* (2013.01); *G06T 7/20* (2013.01); *G06T 7/204* (2013.01); *G06T 7/2033* (2013.01); *A63B 2024/0034* (2013.01); *G01C 2011/36* (2013.01); *G06T 2207/10016* (2013.01); *G06T 2207/10028* (2013.01); *G06T 2207/10048* (2013.01); *G06T 2207/30224* (2013.01); *G06T 2207/30241* (2013.01)

(58) Field of Classification Search
CPC .... G06F 3/011; A63B 69/3614; G01C 11/02
USPC ........... 348/135, 139; 473/151, 409; 702/33, 702/150–153
See application file for complete search history.

(56) References Cited

U.S. PATENT DOCUMENTS

| | | | | |
|---|---|---|---|---|
| 7,544,137 | B2 * | 6/2009 | Richardson | A63B 24/0003 273/317.2 |
| 8,935,103 | B2 * | 1/2015 | Ishii | A63B 24/0021 702/33 |

(Continued)

*Primary Examiner* — Thai Tran
*Assistant Examiner* — Mishawn Hunter (57) ABSTRACT

The present invention relates to a system and method for photographing a moving subject by means of multiple cameras, and acquiring the actual movement trajectory of the subject on the basis of the photographed image. One embodiment of the present invention provides a method for acquiring the movement trajectory of a subject, the method comprising: a step for photographing a moving subject by means of multiple cameras; a step for collecting, from each of the cameras, information on multiple images of the subject and the positions of the images on the relevant camera image frames; and a step for acquiring the movement trajectory of the subject on the basis of the information collected.

7 Claims, 5 Drawing Sheets

(56) References Cited

U.S. PATENT DOCUMENTS

2004/0030527 A1* 2/2004 Rankin ................. G06T 7/2033
       702/153

2005/0233816 A1* 10/2005 Nishino ............. A63B 69/3658
       473/131
2010/0210377 A1* 8/2010 Lock .................. A63B 24/0003
       473/409

* cited by examiner

SYSTEM AND METHOD FOR PHOTOGRAPHING MOVING SUBJECT BY MEANS OF MULTIPLE CAMERAS, AND ACQUIRING ACTUAL MOVEMENT TRAJECTORY OF SUBJECT BASED ON PHOTOGRAPHED IMAGES

CROSS-REFERENCE TO RELATED APPLICATION

Cross-reference is made to another application entitled, "SYSTEM AND METHOD FOR PHOTOGRAPHING MOVING SUBJECT BY MEANS OF FIXED CAMERA, AND ACQUIRING PROJECTION IMAGE OF ACTUAL MOVEMENT TRAJECTORY OF SUBJECT BASED ON PHOTOGRAPHED IMAGE" and filed on the same date as this application by the present applicant. Therefore, those skilled in the art to which the present invention pertains may refer to the invention of the above other application to understand or practice the present invention, or vice versa.

FIELD OF THE INVENTION

The present invention relates to a system and method for photographing a moving subject by means of multiple cameras and acquiring an actual movement trajectory of the subject on the basis of the photographed images thereof.

BACKGROUND

Virtual golf systems are widely spreading which allow golfers to virtually play golf at low cost in downtown areas and the like. The basic concept of such virtual golf systems is to acquire a number of photographed images of a golf ball upon being hit by a golfer, measure physical quantities of the golf ball on the basis of the trajectory, interval, size and the like thereof, perform a simulation of the shot, and display a result of the simulation on a screen.

Conventionally, in order to recognize information on the above physical quantities, particularly the moving direction or moving speed of the golf ball, techniques using multiple cameras synchronized to simultaneously photograph the golf ball have been largely employed.

However, the techniques using such cameras have disadvantages of increasing system production cost or restricting the arrangement of the cameras.

Therefore, following the introduction of a remarkable virtual golf system in Korean Patent No. 1048864 (entitled, "METHOD OF MEASURING PHYSICAL QUANTITIES OF OBJECT BY USING SINGLE LIGHT SOURCE AND PLANAR SENSOR UNIT AND VIRTUAL GOLF SYSTEM UTILIZING SAME") (the contents of which are incorporated herein by reference in its entirety), the inventor(s) now present a novel technique to combine with such virtual golf systems, other virtual golf systems, systems for virtually playing other kinds of sports (e.g., baseball, football, etc.), virtual reality systems for subjects other than balls, or the like to enable them to produce sufficiently good simulation results just using some economical components.

SUMMARY OF THE INVENTION

One object of the present invention is to acquire an actual movement trajectory of a moving ball on the basis of photographed images of the ball.

Another object of the invention is to enable a virtual sport system to produce a sufficiently good simulation result just using some economical components.

Yet another object of the invention is to acquire an actual movement trajectory of a moving subject on the basis of photographed images of the subject.

According to one aspect of the invention to achieve the objects as described above, there is provided a method for acquiring a movement trajectory of a subject, comprising: photographing a moving subject by means of a plurality of cameras; collecting from each of the plurality of cameras a plurality of images of the subject and information on their locations on a corresponding camera image frame; and acquiring a movement trajectory of the subject on the basis of the collected information.

In addition, there may be provided other methods and systems to implement the present invention.

According to the invention, an actual movement trajectory of a moving ball may be acquired on the basis of photographed images of the ball.

According to the invention, a virtual sport system may produce a sufficiently good simulation result just using some economical components.

According to the invention, an actual movement trajectory of a moving subject may be acquired on the basis of photographed images of the subject.

DETAILED DESCRIPTION OF THE PREFERRED EMBODIMENTS

In the following detailed description of the invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, or characteristics described herein may be implemented as modified from one embodiment to another embodiment without departing from the spirit and the scope of the invention. Furthermore, it shall be understood that the locations or arrangements of individual elements within each embodiment may be also modified without departing from the spirit and the scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of Overall System

Figure 1:
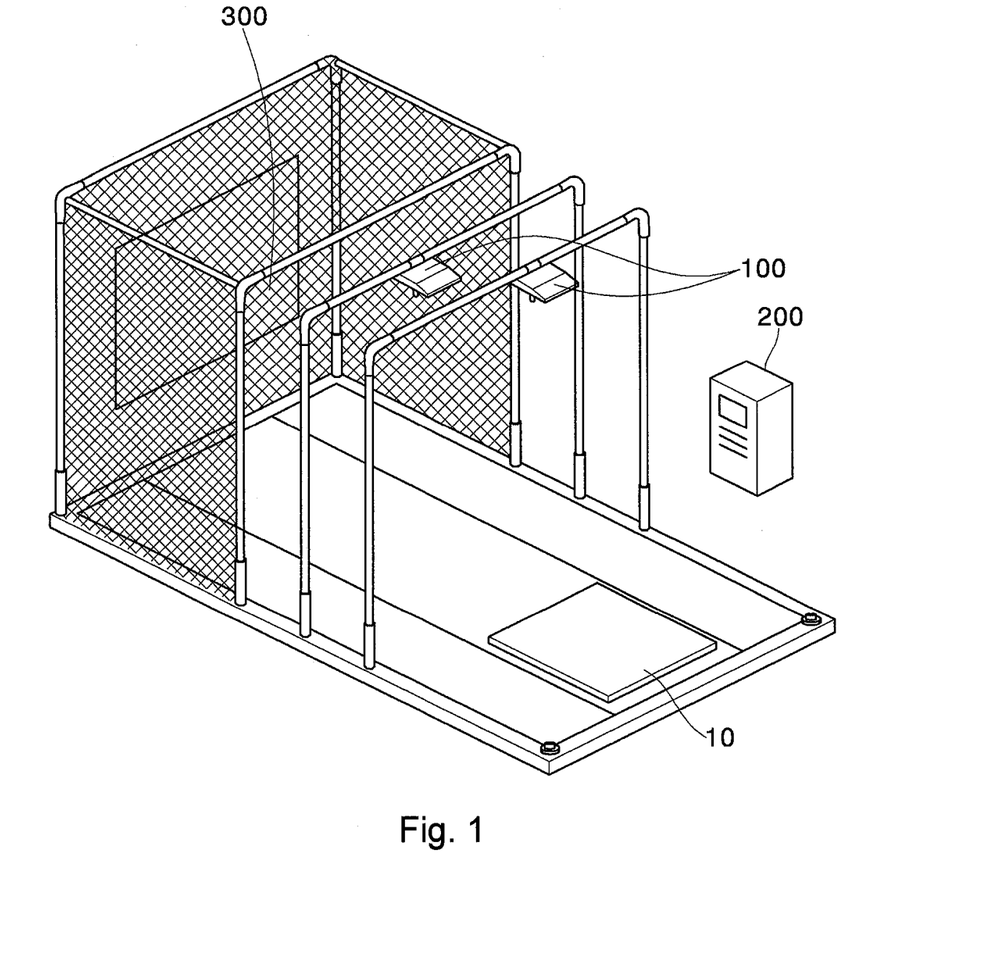
FIG. 1 is a schematic diagram of the overall configuration of a virtual golf system according to one embodiment of the invention.

FIG. 1 is a schematic diagram of the overall configuration of a virtual golf system according to one embodiment of the invention.

As shown in FIG. 1, the virtual golf system may be configured to comprise a shot unit 10, a photographing unit 100, a simulator 200 and a display device 300.

First, the shot unit 10 according to one embodiment of the invention may be a part on which a golfer steps up to place and hit a golf ball when using the virtual golf system. The shot unit 10 may comprise a known swing plate, the tilt angle of which may be adjusted. It will be note that when the invention is applied to other kinds of virtual sport systems, those skilled in the art may modify the configuration of the shot unit 10 and, if necessary, those of other components associated therewith to suit to the characteristics of the corresponding sports.

Next, the photographing unit 100 according to one embodiment of the invention may comprise a plurality of cameras (preferably infrared cameras) so that each of them may perform a function to acquire a number of images of the moving golf ball.

As shown in FIG. 1, the photographing unit 100 may be disposed in a location to look down at the moving golf ball, while it may be disposed in other locations. Preferably, the photographing unit 100 is fixed to the structure as shown in FIG. 1 so that the location and view direction thereof may be invariable. Meanwhile, the plurality of cameras in the photographing unit 100 are preferably spaced apart from each other.

The detailed configuration of the photographing unit 100 will be further described later with reference to FIG. 2.

Next, the simulator 200 according to one embodiment of the invention may perform a function to receive from the photographing unit 100 a plurality of images of the moving golf ball acquired by each of the plurality of cameras, acquire an actual movement trajectory of the golf ball, and perform a simulation on the basis thereof.

The simulator 200 may communicate with the photographing unit 100 and the display device 300, and may comprise a dedicated processor for virtual golf simulation. The dedicated processor may be provided with memory means and have numerical operation and graphics processing capabilities. The simulator 200 may be similar to conventional virtual golf simulation devices.

The configuration of the simulator 200 will be further described later with reference to FIG. 3.

Lastly, the display device 300 according to one embodiment of the invention may perform a function to display a result of the numerical operation or graphics processing of the simulator 200. The display device 300 may display images via display means, and may preferably be configured with a screen, which absorbs the impact of the hit golf ball and does not emit light directly, and a projector to output images on the screen.

Configuration of Photographing Unit

Hereinafter, the internal configuration of the photographing unit 100 according to one embodiment of the invention and the functions of the respective components thereof will be described.

Figure 2:
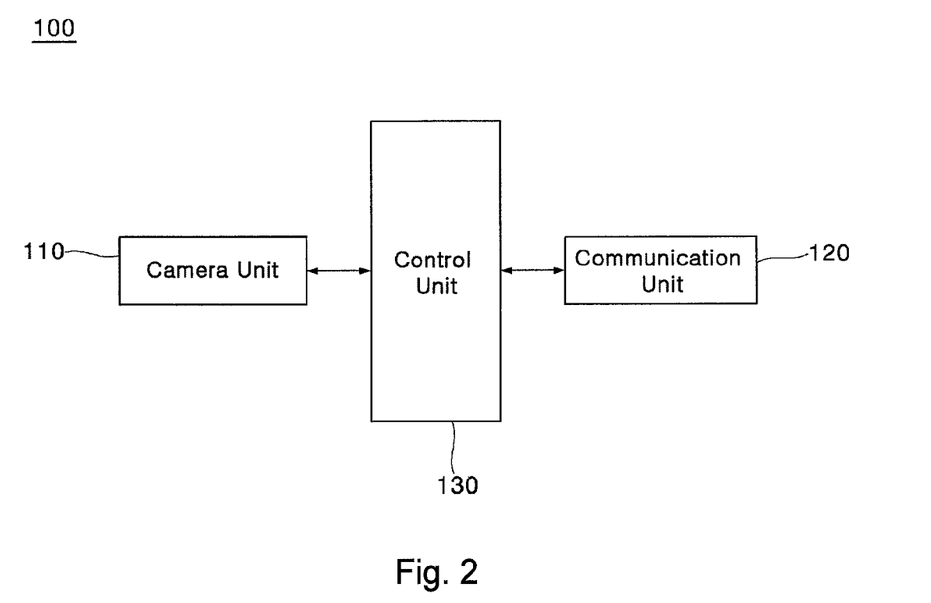
FIG. 2 is a detailed diagram of the internal configuration of a photographing unit 100 according to one embodiment of the invention.

FIG. 2 is a detailed diagram of the internal configuration of the photographing unit 100 according to one embodiment of the invention.

As shown in FIG. 2, the photographing unit 100 may be configured to comprise a camera unit 110, a communication unit 120 and a control unit 130.

According to one embodiment of the invention, at least some of the camera unit 110, the communication unit 120 and the control unit 130 may be program modules to communicate with the simulator 200. The program modules may be included in the photographing unit 100 in the form of operating systems, application program modules or other program modules, while they may be physically stored in a variety of commonly known storage devices. Further, the program modules may also be stored in a remote storage device that may communicate with the photographing unit 100. Meanwhile, such program modules may include, but not limited to, routines, subroutines, programs, objects, components, data structures and the like for performing specific tasks or executing specific abstract data types as will be described below in accordance with the present invention.

First, the camera unit 110 may comprise two or more cameras that may optically acquire images of the moving golf ball. Each of the plurality of cameras may acquire a plurality of images of the moving golf ball from various viewpoints. In this case, there is no need to synchronize the plurality of cameras.

The camera unit 100 may transmit to the control unit 130 each of the photographed images of the moving golf ball together with identification information on the corresponding camera and information on its coordinate on the corresponding camera image frame. This processing may be performed with respect to the plurality of cameras and the corresponding photographed images. In connection with the coordinate on the camera image frame, reference may be made to the aforementioned cross-referenced application.

The cameras of the camera unit 110 may be fixed to the structure as described above and then calibrated as necessary. The above calibration may be directed to calibrating the distortion of a camera image sensor or a lens according to conventional techniques.

Next, the communication unit 120 may perform a function to mediate data transmission/receipt between the control unit 130 and the simulator 200. Although there is no particular limitation on the communication modality that may be employed by the communication unit 120, wired communication such as wired LAN communication and cable communication, or wireless communication such as wireless LAN communication, infrared communication, RF communication and Bluetooth communication may preferably be employed.

Lastly, the control unit 130 may transmit to the simulator 200 various information on the photographed images of the moving golf ball received from the camera unit 110.

Meanwhile, according to the unique principle of the present invention to be described below, an actual movement trajectory of the golf ball may be acquired even when the plurality of cameras are not synchronized to simultaneously photograph the golf ball. Therefore, when all N cameras of the camera unit 110 have a photographing period of T, the control unit 130 may control each of the cameras to photograph in sequence at a time interval of T/N as if cameras having a shorter photographing period of T/N (i.e., having a higher performance in terms of temporal resolution) were used.

Further, when all the N cameras of the camera unit 110 have a photographing period of T, the control unit 130 may control at least some of the cameras to photograph at predetermined time intervals as if cameras having a photographing period shorter than T (i.e., having a higher performance in terms of temporal resolution) were used.

Meanwhile, even when at least some of the photographing periods of the N cameras of the camera unit 110 differ from each other, the control unit 130 may control at least some of the cameras to photograph at predetermined time intervals, so that more photographing data may be obtained.

Configuration of Simulator

Hereinafter, the internal configuration of the simulator 200 according to one embodiment of the invention and the functions of the respective components thereof will be described.

Figure 3:
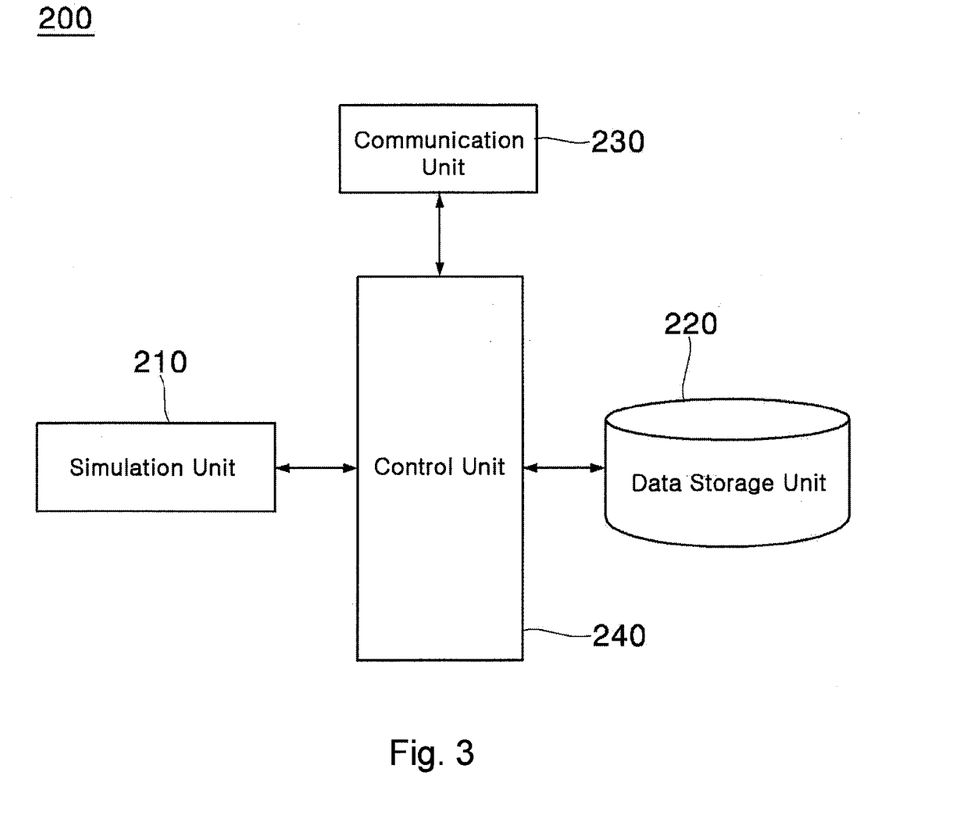
FIG. 3 is a detailed diagram of the internal configuration of a simulator 200 according to one embodiment of the invention.

FIG. 3 is a detailed diagram of the internal configuration of the simulator 200 according to one embodiment of the invention.

As shown in FIG. 3, the simulator 200 according to one embodiment of the invention may be configured to comprise a simulation unit 210, a data storage unit 220, a communication unit 230 and a control unit 240.

According to one embodiment of the invention, at least some of the simulation unit 210, the data storage unit 220, the communication unit 230 and the control unit 240 may be program modules to communicate with the photographing unit 100 or the display device 300. The program modules may be included in the simulator 200 in the form of operating systems, application program modules or other program modules, while they may be physically stored in a variety of commonly known storage devices. Further, the program modules may also be stored in a remote storage device that may communicate with the simulator 200. Meanwhile, such program modules may include, but not limited to, routines, subroutines, programs, objects, components, data structures and the like for performing specific tasks or executing specific abstract data types as will be described below in accordance with the present invention.

Figure 4:
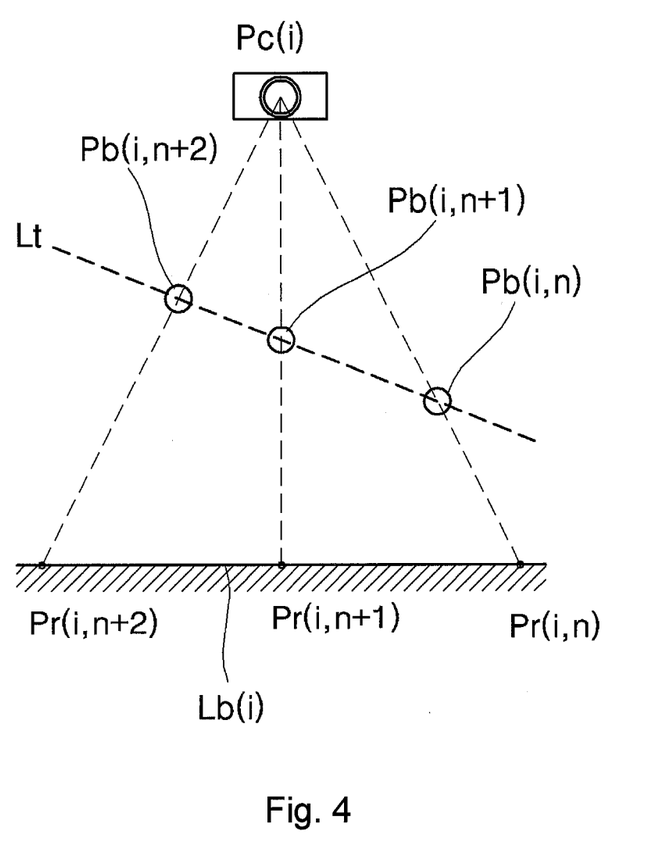
FIG. 4 shows one concept employed in the present invention.

First, the simulation unit 210 may receive from the photographing unit 100 various information on the photographed images of the moving golf ball as described above. Using the information, the simulation unit 210 may acquire an actual movement trajectory and moving speed of the golf ball through the following operational processing. Reference will be made to FIG. 4. (FIG. 4 shows one concept employed in the present invention.)

1. Acquiring a plane determined by the location point of a camera and the points at which the location points of the golf ball when being photographed by the corresponding camera are projected onto a background region In FIG. 4, $Pc(i)$ represents the location point of an $i^{th}$ camera of the plurality of cameras. The simulation unit 210 may already be aware of the coordinate of $Pc(i)$.

Further, $Pb(i, n)$ to $Pb(i, n+2)$ represent the location points at which the golf ball is actually located when being photographed by the $i^{th}$ camera for the $n^{th}$ to $n+2^{th}$ times. They are on a straight line Lt, which is an actual movement trajectory of the golf ball. (Here, although the actual movement trajectory of the golf ball is not necessarily a straight line, it should be noted that the line Lt may be assumed to be straight because a trajectory of a golf ball appears to be almost straight immediately after being hit.) Further, the straight line Lt may represent an approximate movement trajectory of the golf ball for a given time span.

$Pr(i, n)$ represents the point at which $Pb(i, n)$ is projected from a viewpoint of the $i^{th}$ camera onto a ground surface as a background region. According to the principle of the invention disclosed in the cross-referenced application, the simulation unit 210 may determine the coordinate on the ground surface of the above point based on, for example, the coordinate on the camera image frame of the image in which the golf ball located at $Pb(i, n)$ is photographed by the $i^{th}$ camera, and a coordinate conversion matrix which may already be obtained for the $i^{th}$ camera. In the same manner, $Pr(i, n+1)$ and $Pr(i, n+2)$ represent the points at which $Pb(i, n+1)$ and $Pb(i, n+2)$ are projected from the viewpoint of the $i^{th}$ camera onto the ground surface. The coordinates on the ground surface of those points may also be determined.

Therefore, the simulation unit 210 may acquire a plane uniquely determined by $Pc(i)$ and a straight line $Lb(i)$ formed by $Pr(i, n)$ to $Pr(i, n+2)$.

2. Acquiring a plurality of planes containing a movement trajectory of the golf ball Those planes may contain the straight line Lt. Further, the simulation unit 210 may also perform the first processing with respect to an $i+1^{th}$ camera. Naturally, the simulation unit 210 may also perform the first processing with respect to an $i+2^{th}$ camera, as necessary. Thus, the simulation unit 210 may acquire one more plane containing the straight line Lt at each time of performing the processing.

3. Acquiring a movement trajectory of the golf ball

Figure 5:
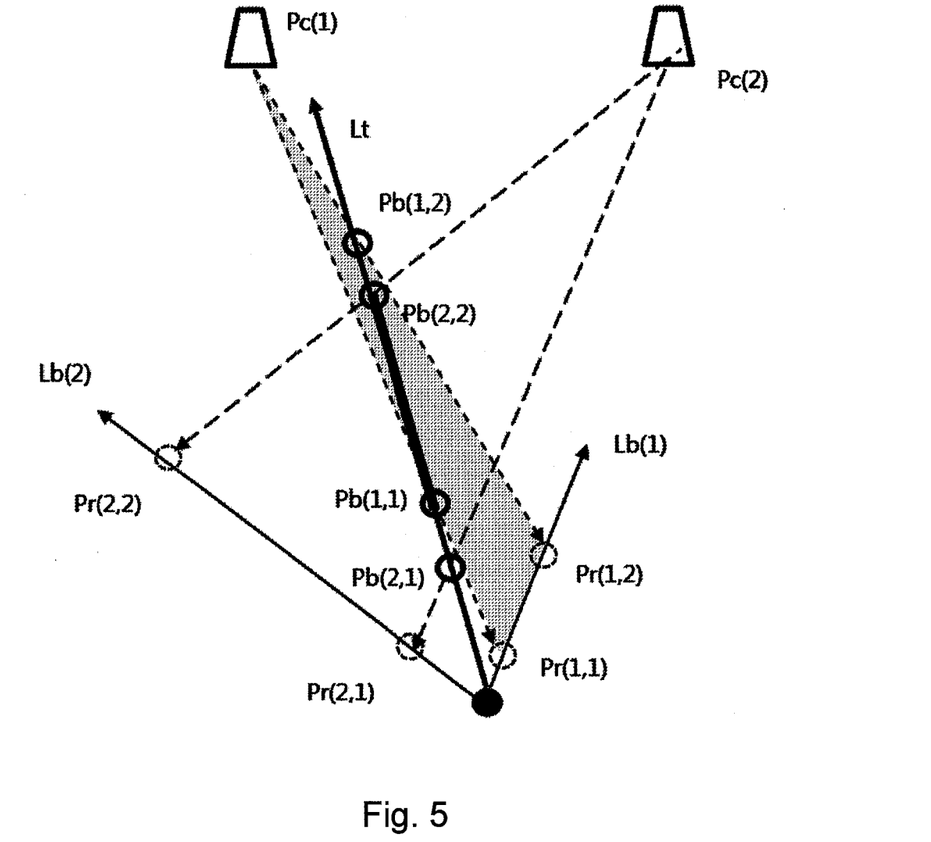
FIG. 5 illustrates a line of intersection obtained when using two cameras according to one embodiment of the invention.

The simulation unit 210 may acquire a line of intersection (shown by the thick line in FIG. 5) of the planes acquired from the second processing. (FIG. 5 illustrates a line of intersection obtained when using two cameras according to one embodiment of the invention.) This line coincides with the straight line Lt, which is the actual movement trajectory of the golf ball.

4. Acquiring a moving speed of the golf ball

The simulation unit 210 may also obtain the coordinate of $Pb(i, n)$ using the straight line Lt acquired from the third processing and the known coordinates of $Pc(i)$ and $Pr(i, n)$. In the same manner, the coordinate of $Pb(i, n+1)$ may also be obtained. Thus, the simulation unit 210 may acquire an actual moving speed of the golf ball by dividing the distance between the obtained two coordinates by the photographing period of the $i^{th}$ camera.

Meanwhile, although it has been illustrated above that the simulation unit 210 may operationally acquire the movement trajectory and moving speed of the golf ball, it will be apparent to those skilled in the art that at least a part of the operational procedure may be performed by other operational components such as the control unit 130 of the photographing unit 100.

Next, the data storage unit 220 may store various information used or derived in the above-described operational procedure, or other information required for the simulation. The data storage unit 220 may comprise a computer-readable recording medium.

Next, the communication unit 230 may perform a function to enable data transmission/receipt to/from the simulation unit 210 and the data storage unit 220. Although there is no particular limitation on the communication modality that may be employed by the communication unit 230, wired communication such as wired LAN communication and cable communication, or wireless communication such as wireless LAN communication, infrared communication, RF communication and Bluetooth communication may preferably be employed.

Lastly, the control unit 240 may perform a function to control data flow among the simulation unit 210, the data storage unit 220 and the communication unit 230. That is, the control unit 240 according to the present invention may control data flow into/out of the simulator 200 or data flow among the respective components of the simulator 200, such that the simulation unit 210, the data storage unit 220 and the communication unit 230 may carry out their particular functions, respectively.

Although it has been mainly described above that the system of the present invention is a virtual golf system, it will be apparent to those skilled in the art that the technical principle and configuration of the invention may be applied to all kinds of virtual reality systems (e.g., virtual baseball systems or virtual football systems) requiring simulation of the movement of a subject.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described in terms of specific items such as detailed elements as well as the limited embodiments and the drawings, they are only provided to help general understanding of the invention, and the present invention is not limited to the above embodiments. It will be appreciated by a person of ordinary skill in the art that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for acquiring a movement trajectory of a subject, comprising:

photographing a moving subject by means of a plurality of cameras, wherein the plurality of cameras are fixed facing a background region;

collecting from each of the plurality of cameras a plurality of images of the subject and information on their locations on a corresponding camera image frame;

acquiring a movement trajectory of the subject on the basis of the collected information; and determining at least two planes related to the movement trajectory of the subject and a line of intersection of the at least two planes, wherein each of the at least two planes contains a location point of the corresponding camera and projection points of the subject being projected from a viewpoint of the corresponding camera onto the background region.

2. A method as claimed in claim 1, wherein the plurality of cameras are spaced apart from each other.

3. A method as claimed in claim 1, wherein the location on the background region of each of the projection points is determined by the location on the corresponding camera image frame of the corresponding image and a unique location coordinate conversion matrix of the corresponding camera.

4. A method as claimed in claim 3, further comprising acquiring a moving speed of the subject on the basis of the movement trajectory of the subject, the location of at least one of the plurality of cameras and those of the corresponding projection points, and a photographing period of the camera.

5. A method as claimed in claim 1, wherein each of the plurality of cameras is controlled to photograph at a time interval equal to a photographing period thereof being divided by the number of the plurality of cameras.

6. A method as claimed in claim 1, wherein at least some of the plurality of cameras are controlled to photograph at predetermined time intervals.

7. A system for acquiring a movement trajectory of a subject, comprising:

a plurality of cameras to photograph a moving subject, wherein the plurality of cameras are fixed facing a background region; and a simulator to collect from each of the plurality of cameras a plurality of images of the subject and information on their locations on a corresponding camera image frame, to acquire a movement trajectory of the subject on the basis of the collected information, and to determine at least two planes related to the movement trajectory of the subject and a line of intersection of the at least two planes, wherein each of the at least two planes contains a location point of the corresponding camera and projection points of the subject being projected from a viewpoint of the corresponding camera onto the background region.

* * * * *